United States Patent [19]

Fredriksson et al.

[11] 4,015,202
[45] Mar. 29, 1977

[54] AUTOMATIC MEASUREMENT AND DISPLAY OF RESONANCE FREQUENCIES OF SEISMIC DETECTION ELEMENTS

[75] Inventors: Oke A. Fredriksson; Elmer L. Thomas, both of Fullerton, Calif.

[73] Assignee: Chevron Research Company, San Francisco, Calif.

[22] Filed: Oct. 1, 1975

[21] Appl. No.: 618,606

[52] U.S. Cl. .......................... 324/57 Q; 324/83 FE
[51] Int. Cl.² ...................................... G01R 27/00
[58] Field of Search .............. 324/57 Q, 56, 83 FE, 324/62

[56] References Cited
UNITED STATES PATENTS 2,986,696  5/1961  Seay ........................... 324/57 Q
3,717,810  2/1973  Spanbauer ...................... 324/62 X
3,832,630  8/1974  Micol et al. .................. 324/57 Q X
3,840,804  10/1974  Sauerland ......................... 324/56

*Primary Examiner*—Stanley T. Krawczewicz
*Attorney, Agent, or Firm*—R. L. Freeland, Jr.; H. D. Messner

[57] ABSTRACT

An apparatus and a method are described with which the resonance frequencies of seismic detector elements, such as geophones, hydrophones, or sets of geophones or hydrophones, may be automatically determined and displayed with relatively high precision, e.g., to two decimal places. The apparatus is useful under rough field conditions, as well as under laboratory conditions.

7 Claims, 11 Drawing Figures

AUTOMATIC MEASUREMENT AND DISPLAY OF RESONANCE FREQUENCIES OF SEISMIC DETECTION ELEMENTS

RELATED APPLICATIONS INCORPORATED HEREIN BY REFERENCE

"Digital Processor for Selectively Synthesizing Sinusoidal Waveforms, Say Suitable for Testing Geophones or Combinations of Geophones of a Geophysical Data Acquisition System", O. A. Fredriksson and E. L. Thomas, Ser. No. 618,550, filed Oct. 1, 1975, and "Automatic Method and Apparatus for Digitally Indicating Response Characteristics of Geophones of a Geophysical Data Acquisition System", O. A. Fredriksson and E. L. Thomas, Ser. No. 618,602, filed Oct. 1, 1975.

FIELD OF THE INVENTION

This invention is directed to a method and apparatus for automatically indicating the resonance frequency of one or more reactive detector elements within a geophysical data acquisition system. The method and apparatus are capable of laboratory precision, although they may be used in a field environment.

SUMMARY OF THE INVENTION

In accordance with the present invention, the resonance frequency of a seismic detector element, which may be a geophone, a hydrophone, or a set of geophones or of hydrophones, may be automatically determined and displayed with relatively high precision, e.g., to two decimal places. The method involves sensing the phase difference between two sinusoidal voltages of identical frequency, one being applied to a pure resistance and the other being applied to the tested seismic detector element, under such conditions that the respective currents caused to flow through the pure resistance and through the element being tested remain equal and opposite. Then the (identical) frequency of both of the sinusoidal voltages is automatically changed until the phase difference between the two voltages is exactly 180 degrees. The frequency at which this condition is reached is, by definition, the sought resonance frequency.

The relatively high precision of the automatic frequency determination and display is partly due to the use of a sine wave voltage synthesizer, synthesizing the required voltage from a large number of discrete constant voltages, changing from one voltage value to the next in response to activation pulses of a relatively high repetition rate, at least a hundred times and conveniently 360 times the frequency of the approximated sine wave. The activation pulses, whose repetition rate must be exactly proportional to the frequency of the sine wave, are counted rather than the cycles of the sine wave itself.

BACKGROUND OF THE INVENTION

In seismic exploration, generated acoustic waves are transmitted downward into the earth. At the transition zones between various types of rock strata, reflections of the acoustic waves occur, and attenuated parts of the reflected waves get back to the earth's surface where they are detected by groups of geophones planted at the earth's surface. Each geophone group (which can comprise a number of individual geophones) produces an electrical signal in response to the detected acoustic wave, and each geophone group transmits its electrical signal to a recording truck nearby.

Seismic detecting equipment, beginning with the primary detectors, the geophones (or hydrophones, in the case of marine exploration), must be tested occasionally to make certain that the rough field use it customarily receives has not impaired its sensitivity and general usefulness. To date, there are no standard tests for geophones, but certain measurable properties have begun to be recognized as diagnostic, e.g., the resonance frequency, the impedance, and the damping factor. (The following references go into detail about previous measurements of these properties: Mark Products, Inc., Catalogue, February 1968, pp. 3–14; "The Phone" published by Walker-Hall-Sears, Inc., Spring 1974; and U.S. Pat. No. 3,717,810 to F. I. Spanbauer, Feb. 20, 1973). The present invention is concerned mainly with the measurement of one of these mentioned properties, the resonance frequency.

OBJECTS OF THE INVENTION

An object of the present invention is the provision of a novel apparatus and method for automatically determining the resonance frequency of a seismic detector element (geophone or hydrophone, or set of geophones or hydrophones) of a geophysical data acquisition system.

A further object is to provide an apparatus and method for such automatic determination with high precision, even under the relatively rugged conditions of a working field environment.

Further objects, features and advantages of the present invention will be come apparent to those skilled in the art from a detailed reading of the following description of preferred embodiments in conjunction with the accompanying drawings.

DESCRIPTION OF PREFERRED EMBODIMENTS OF THE INVENTION

Figure 1:
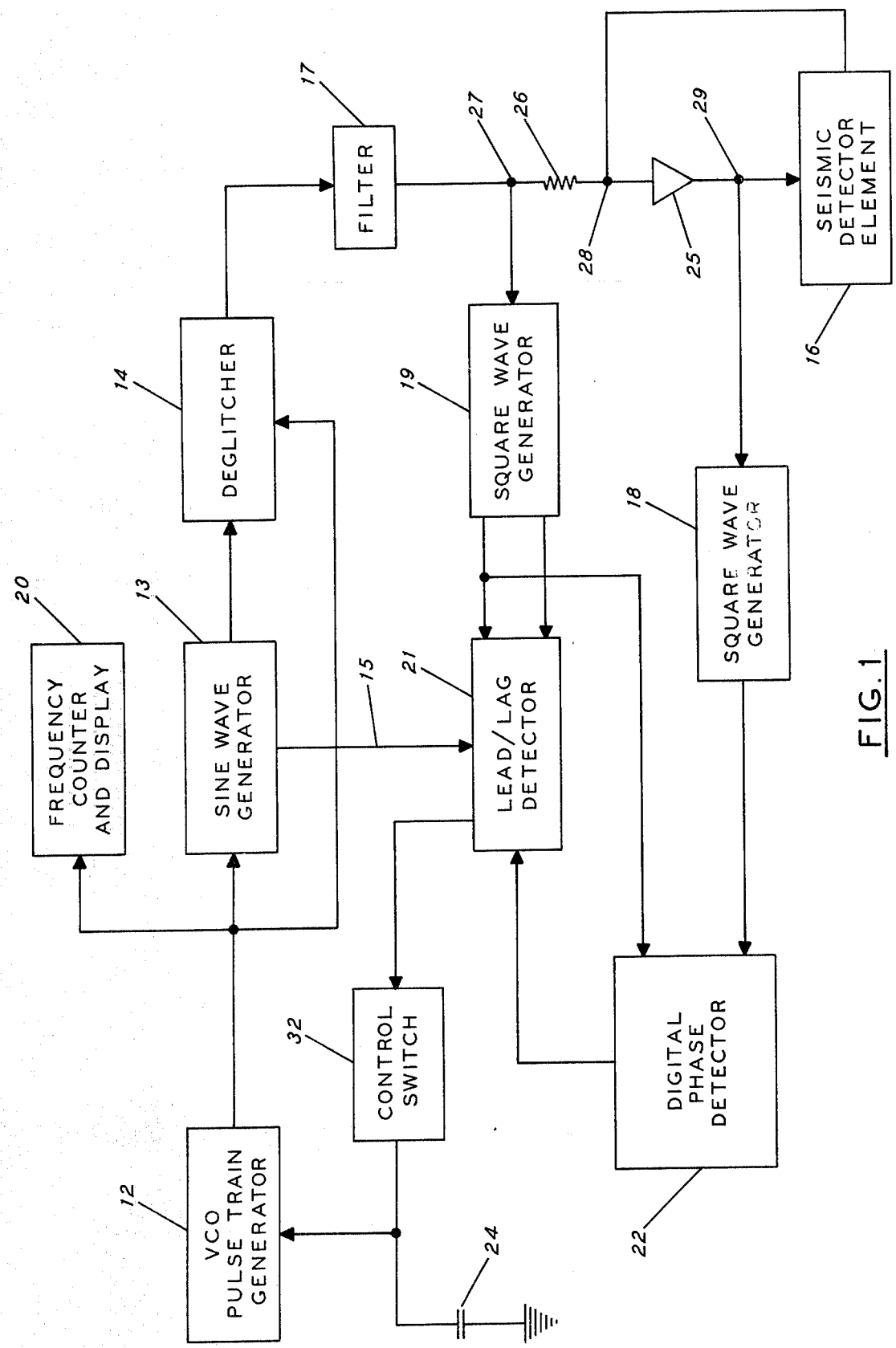
FIG. 1 is a block diagram of the automatic resonance measuring circuit of the present invention showing the seismic detector element being tested in the circuit.

Reference is now made to FIG. 1, the block diagram of the automatic resonance frequency measuring circuit. At the lower right-hand side of the diagram is the seismic detector element 16 that is under test. Element 16 is fed a sine wave current, of frequency somewhere near its resonance frequency, by operational amplifier 25, and that current is being produced by operational amplifier 25 in response to an impressed sine wave voltage (produced in parts of the circuit to be described later) applied at the point 27 at the upper end of pure resistance 26. The seismic detector element 16 is in the feedback loop of operational amplifier 25, and as is well known from the theory of modern operational amplifiers having very high amplification factors, the currents flowing toward point 28 at the input of operational amplifier 25 must negate each other, so the sine wave current flowing through seismic detector element 16 back to point 28 must be equal and opposite to that flowing down from point 27 to point 28. This equal and opposite current condition maintains itself at point 28 no matter what the frequency of the voltage applied at point 27.

The over-all objective is now to make the apparatus of FIG. 1 automatically change whatever frequency of voltage is first applied to point 27 toward that particular frequency that will cause the voltages across element 16 and resistor 26 to be exactly opposite in phase. Because the currents through element 16 and resistor 26 are always equal and opposite, and because the voltage through pure resistor 26 is necessarily in phase with the current through resistor 26, then when the voltages across resistor 26 and element 16 are exactly opposite in phase, element 16 must also be behaving as a pure resistance, and the frequency at which it does this is, by definition, its resonance frequency. (The kind of "resonance" concerned here is "phase resonance". Other types of resonance that occur at slightly different frequencies are definable, but "phase resonance" has been found most useful in this kind of seismic instrument testing).

In order to make the frequency change automatically toward the frequency at which the voltage at drive point 29 will be exactly opposite in phase with the source voltage at point 27, it is first necessary to generate a signal from the two voltages that measures their phase difference, and then to use this signal to make the automatic frequency change. So a description will now be given of how a signal is generated that represents the phase difference of the respective voltages at point 27 and at drive point 29. The phase difference must be represented in both magnitude and sign.

Figure 2:
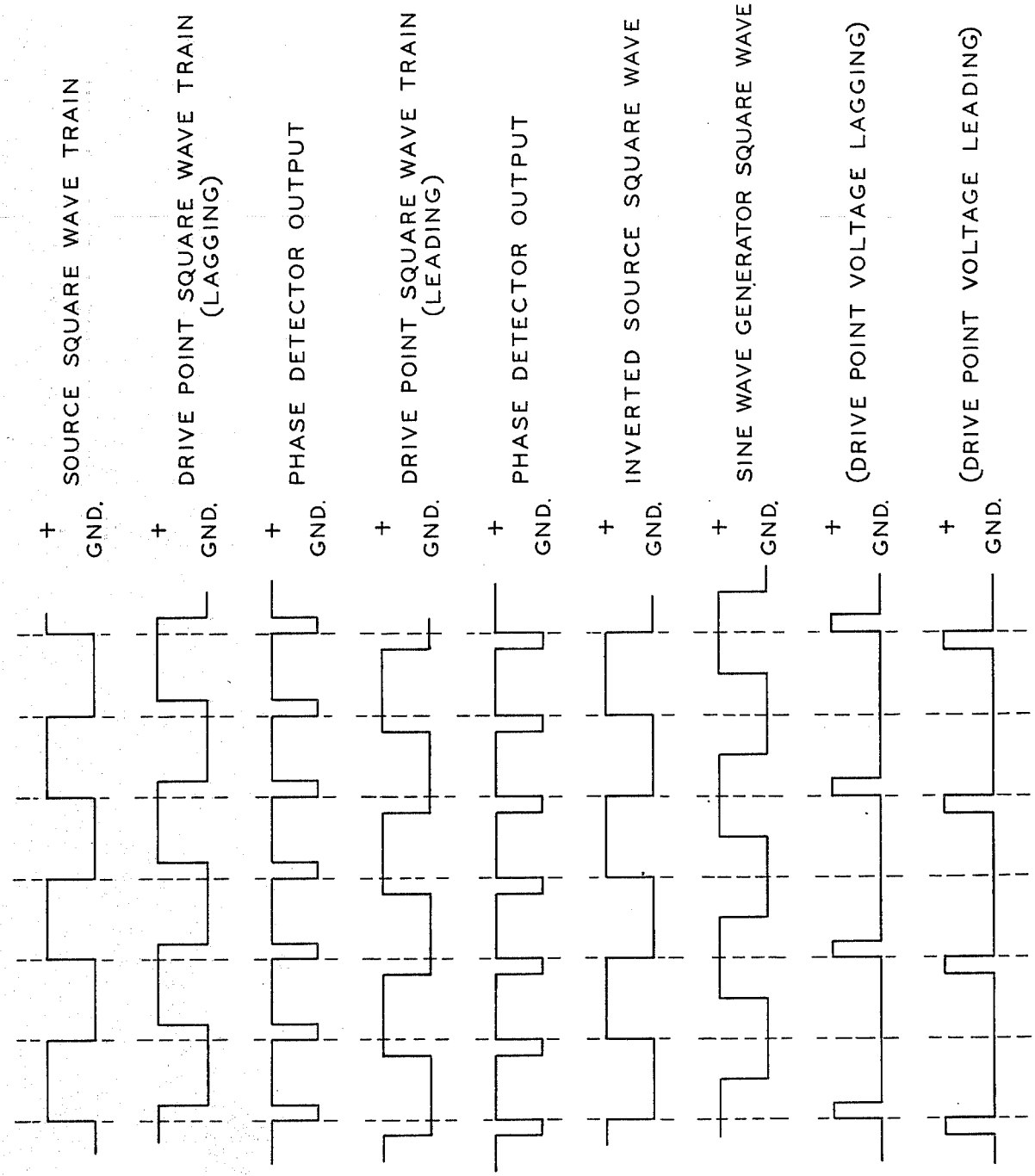
FIG. 2 shows electrical waveforms passing between various parts of the circuit of FIG. 1 and illustrates principles involved in the automatic phase detection and phase adjustment as provided by and in accordance with the circuit of FIG. 1.

The evolution of the phase discrimination signal is represented in FIG. 2, which will now be referred to jointly with FIG. 1. The voltage from point 27 is impressed upon square wave generator 19, which is essentially an amplifier and clipper, so that out of square wave generator 19 comes a square wave train whose positive and negative portions correspond respectively to the positive and negative portions of the voltage at point 27, and most importantly whose rising and falling edges correspond exactly in time to the zero crossings of the voltage at point 27. The square wave train out of generator 19 is represented by FIG. 2A, where it is called the source square wave train. Likewise, the voltage from drive point 29 is impressed upon square wave generator 18, out of which comes a square wave train whose rising and falling edges correspond to the zero crossings of the voltage at drive point 29. The square wave train out of generator 18 is represented by FIG. 2B, where it is called the drive point square wave train.

The dotted vertical lines in FIG. 2 represent equal times, and so in the case represented by FIGS. 2A and 2B, the drive point square wave train is lagging the source square wave train. If the seismic detector element under test is a geophone, which behaves essentially as if its inductance and capacitance were in parallel, the lagging drive point square wave indicates that the frequency being applied to the detector element is higher than the resonance frequency, so the frequency needs to be lowered.

Square wave trains 2A and 2B from generators 19 and 18 are fed into digital phase detector 22, consisting essentially of an exclusive OR gate, which gives out a plus voltage only when the input voltages are of unlike sign. Waveform 2C is the resultant from feeding into phase detector 22 the source square wave train and a drive point square wave train that lags the source square wave train. If, rather than drive point square wave train 2B, phase detector 22 were fed drive point square wave train 2D, which leads source square wave train 2A, the resultant would be phase detector output 2E.

Apparently, phase detector outputs 2C and 2E are similar in general shape; their important difference is that in waveform 2C the relatively narrow, downward pulses that represent the phase difference immediately follow the rising and falling edges of the source square wave train 2A, while on the contrary in waveform 2E the relatively narrow, downward pulses that represent the phase difference immediately precede the rising and falling edges of the source square wave train 2A. This distinction is what is used to determine whether the frequency is going to be decreased or increased.

When waveform 2C is compared with waveform 2A, it is apparent that among the relatively narrow downward pulses of waveform 2C the first, third, fifth, etc., coincide with upward (positive) parts of waveform 2A, but the even-numbered downward pulses do not coincide with upward (positive) parts of waveform 2A. On the other hand, when waveform 2E is compared with waveform 2A, it is apparent that among the relatively narrow downward pulses of waveform 2E, the first, third, fifth, etc., do not coincide with upward (positive) parts of waveform 2A, and the even-numbered downward pulses do coincide with upward positive parts of waveform 2A. This suggests that if only the odd-numbered pulses are selected (or alternatively only the even-numbered pulses were selected) waveforms 2A and 2E can be distinguished from each other by testing for coincidence with the upward (positive) parts of waveform 2A.

Referring again to FIG. 1, at this stage of the description it will be recognized that the preceding paragraphs have concerned themselves with voltage waveforms that are to be fed into lead/lag detector 21, the waveform 2A that comes from square wave generator 19 and the waveform 2C, or 2E, that comes from digital phase detector 22. To assist in the operation of eliminating the even-numbered downward pulses of waveform 2C, or 2E, and the operation of discriminating between waveforms such as 2C and 2E, two more waveforms are fed into lead/lag detector 21. The first is waveform 2F, which is merely waveform 2A inverted. All that is required to provide additional waveform 2F is an inverted inside square wave generator 19. The second additional waveform introduced into lead/lag detector 21 is waveform 2G, which is just waveform 2A shifted 90 degrees. The reader is asked to accept tentatively that this shifted waveform is readily available out of a part of the apparatus whose description falls more naturally farther on in this disclosure, the sine wave generator 13.

Figure 3:
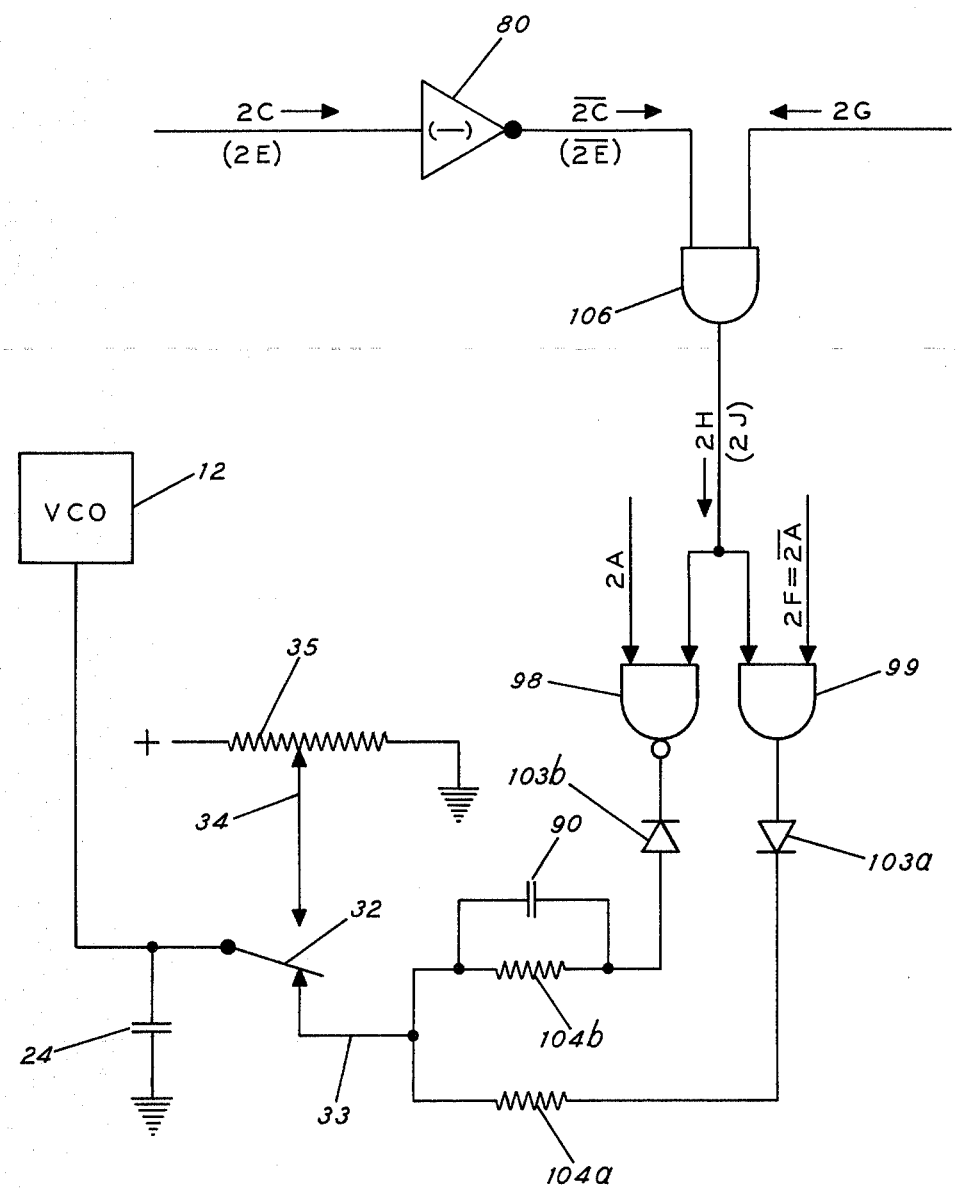
FIG. 3 is a detailed circuit diagram of the lead/lag detector of FIG. 1, such detector discriminating phase and supplying positive correctional pulses when the frequency being applied to the seismic detector elements needs to be raised, and supplying negative correctional pulses when that frequency needs to be lowered.

Reference is now made to FIG. 3, in which are represented parts of lead/lag detector 21. Voltage waveform 2C is fed through inverter 80 to make it inverse, waveform $\overline{2C}$ (zero where 2C is + and + where 2C is zero). Waveforms $\overline{2C}$ and 2G are fed into AND gate 106. Out of AND gate 106 comes the desired waveform 2H which can be recognized as 2C not only inverted, but also with its even-numbered pulses eliminated. Similarly, if waveform 2E has been used instead of waveform 2C, other conditions being the same, out of AND gate 106 would have come waveform 2J, which can be recognized as waveform 2E inverted, with its even-numbered pulses eliminated.

Waveform 2H (or waveform 2J) is now fed into both NAND gate 98 and AND gate 99. The other input to NAND gate 98 is the waveform 2A, and the other input to AND gate 99 is the waveform 2F (2A inverted). Recalling the rule followed by AND gates (plus output only when both inputs are plus) one may readily deduce that when waveform 2H is fed in, NAND gate 98 will give out negative pulses (actually dips from a plus potential to ground potential) coinciding in time with the narrow positive pulses of waveform 2H. With the same waveform 2H fed in, AND gate 99 will give out no signal; its output will remain at ground potential. On the other hand, when waveform 2J is fed in, NAND gate 98 will give out no signal; its output potential will remain a positive constant, but AND gate 99 will now give out positive pulses corresponding in time to the positive pulses of waveform 2J.

At this juncture, the desired discrimination has been accomplished. When the voltage that is driving current through seismic detector element 16 lags that current, negative pulses (dips to ground potential) of width corresponding to the amount of lag will be emitted from NAND gate 98; and when the voltage that is driving current through seismic detector element 16 leads that current, positive pulses of width corresponding to the amount of lead will be emitted from AND gate 99. The negative-going pulses are now to be used to produce the indicated necessary lowering of the frequency of the voltage that has been applied to seismic detector element 16; or the positive pulses are now to be used to produce the indicated necessary raising of the frequency of the voltage that has been applied to seismic detector element 16.

Still referring to FIG. 3, the negative-going pulses from NAND gate 98 permit current to flow through diode 103*b* into NAND gate 98. That current comes ultimately from capacitor 24 (although some of it may come immediately from capacitor 90) and tends to discharge capacitor 24 and lower its voltage. On the other hand, positive pulses from AND gate 99 cause current to flow through diode 103*a* toward capacitor 24, tending to charge capacitor 24 and raise its voltage. The voltage on capacitor 24 controls the frequency of voltage-controlled oscillator 12, and so the over-all process has now been described by which a leading drive point voltage causes an automatic raising of the frequency of voltage-controlled oscillator 12 and a lagging drive point voltage causes an automatic lowering of that frequency.

In order not to detract from the course of the explanation of the over-all operation, the description of the details of the circuitry between the two gates 98 and 99 and capacitor 24 was held aside until now. These details are not essential to the over-all operation, because there are several alternative ways in which the same circuitry problems could have been solved by someone skilled in electronics. However, the particular solution represented in FIG. 3 may be simpler and more convenient that the alternatives. The leg of the circuit out of NAND gate 98 has a capacitor 90 shunting resistor 104*b*, whereas the corresponding leg out of AND gate 99 has no corresponding capacitor. Capacitor 90 solves the problem resulting from the natural asymmetry between the two mentioned legs. In the actual apparatus constructed by the present inventors, voltage-controlled oscillator 12 requires a control voltage input of about one volt in order to cause frequencies of about 8 Hz to be applied to the seismic detector elements to be tested so that the voltage on capacitor 24 is about one volt. The positive pulses from AND gate 99 have a magnitude of about 6 volts, and even after a drop of 0.6 volt across diode 103*a*, there remains about 4.4 volts difference between AND gate 99 and capacitor 24 with which to send current through resistor 104*a* toward capacitor 24. On the other hand, the negative pulses from NAND gate 98 are actually drops from +6 volts to ground voltage, so with a voltage drop of about 0.6 volt across diode 103*b* there is left only an 0.4 volt difference to pull charge from capacitor 24 through resistor 104*b*; and whereas, if all the other circuit constants had been favorable, this problem might have been solved merely by making the resistance of resistor 104*b* one-tenth that of resistor 104*a*, it was actually found that this did not symmetrize the desired positive and negative actions. The negative pulses were still relatively too weak, and the frequency tended to hunt, spending too much time on the too-high side. Capacitor 90 solves the problem by taking a finite decrement of charge from capacitor 24, effective instantaneously, whenever the negative leg is activated. Capacitor 90 has a relatively small capacity, only one-thousandth that of capacitor 24, but it effectively symmetrizes the action of the positive and negative legs leading toward capacitor 24.

The remaining details represented in FIG. 3 are those of control switch 32 (also represented in FIG. 1). In the preceding discussion, control switch 32 has been tacitly assumed to be down, as shown, to connect capacitor 24 with the automatic frequency adjusting circuitry. Switch 32 permits a change to nonautomatic frequency adjustment. When it is in the upward position, the voltage on capacitor 24 becomes whatever voltage is tapped from potentiometer 35, whose arm 34 can be manually controlled.

Referring back to FIG. 1, the description above told how the voltage on capacitor 24 was controlled by positive, or negative, pulses out of lead/lag detector 21; and it was stated that the voltage on capacitor 24, in turn, controlled the frequency of voltage-controlled oscillator (VCO) 12. The remaining description will deal with the output of VCO 12 and how that output determines the frequency of the sine wave voltage applied to the seismic detector element 16 whose resonance frequency is being sought. VCO 12 actually emits a train of pulses whose repetition rate is many times the frequency of the sine wave voltage to be applied to seismic detector element 16. There are two reasons for the relatively high repetition rate: first the frequency of the sine wave voltage to be applied to seismic detector element 16 is desired to be known very accurately, e.g., to two decimal places; and if the pulse repetition rate is an exact multiple of the desired frequency; and of the order of a hundred times the desired frequency, then the frequency counter 20 can measure that desired frequency by counting the pulses out of VCO 12 over a time interval only one-hundredth as long as would be required to count cycles of the desired sinusoidal frequency. In the actual apparatus we have built, it has been convenient and useful to use a pulse repetition rate 360 times the desired final output frequency so that the time between pulses corresponds to one degree of the sine wave, and the counter needs to count over only 1/360 the time it would count if it were counting sinusoidal cycles. Second, the sine wave generator 13 consists essentially of a read-only memory in which digital numbers are stored that represent ordinates of a sine wave, and these individual numbers are read and converted into analog values of the sine wave in response to the individual pulses out of VCO 12. Obviously, then, the higher the pulse repetition rate out of VCO 12 in relation to the desired sinusoidal frequency, the finer can be the subdivision of the sine wave into its digital ordinate values and the more accurately the output of sine wave generator 13 can approximate an ideal, smooth sine wave.

Regarding the first reason for the relatively high repetition rate of the activation pulses out of VCO 12, the attainment of high precision in measuring the frequency, the quantitative advantages can be best expressed mathematically:

If, as is actually the case, the frequencies being measured are of the order of 10 cycles per second, and if two-decimal-place precision is desired (e.g., 8.58 cycles per second), then to get that precision by mere counting of the cycles of the sine wave itself would require counting of the order of a thousand cycles, which would take of the order of a hundred seconds, too long a time in a practical operation. On the other hand, if each cycle were known to be associated with exactly C pulses cut of VCO 12, the number of these pulses occurring in one second, divided by 100, or equivalently that number with the last two decimal digits preceded by a decimal place, would be the sinusoidal frequency to two decimal places. More generally, if C were the number of activation pulses per cycle of the sine wave and D were the number of decimal places desired in the frequency representation, the time period, $\Delta t$, over which the counter 20 would need to count to reach the desired precision would be:

$$\Delta t = \frac{10^D}{C} \text{ seconds}$$

In the apparatus actually constructed by the inventors, D was 2 and C was 360 (1 pulse per degree) so $\Delta t$ was 100/360 = 0.2778 second.

Most of the descriptive details about sine wave generator 13 are given in a copending application, Ser. No. 618,550, incorporated hereinbefore, and are intended to be incorporated into the present specification by reference to that application. However, one particular detail about sine wave generator 13 needs to be mentioned here because it relates back to the operation of lead/lag detector 21.

Referring back to FIG. 2, which depicted the various waveforms fed into lead/lag detector 21, and to the already given description of the operation of lead/lag detector 21, mention was made of the "waveform 2G, which is just waveform 2A shifted 90 degrees". Waveform 2A has positive and negative portions that correspond respectively to the positive and negative portions of the voltage at point 27, which is the refined output of sine wave generator 13. Waveform 2G is waveform 2A shifted by 90 degrees. To understand completely the origin of waveform 2G, it is necessary to know only that the read-only memory within sine wave generator 13 contains stored digital numbers that correspond to analog voltage values of two quarter periods of the sine wave, one positive quarter wave and its following negative quarter wave. For the generation of the full wave, the individual activating pulses out of VCO 12 cause individual values to be produced out of the read-only memory beginning, say, with the most positive value and going toward the most negative value. A counter keeps track of the number of activating pulses, and when enough have come in to cause the memory to produce all values from the most positive to the most negative, the counter produces a voltage step that switches the downward reading succession to an upward reading succession. The up and down voltage steps of this up-down counter, which occur at the positive and negative peaks of the generated sine wave, are themselves the upward and downward portions of waveform 2G merely brought out of sine wave generator 13 by lead 15 and fed into lead/lag detector 21.

For completeness, two more components of the overall circuit are shown explicitly in FIG. 1, deglitcher 14 and filter 17, even though these parts are more completely described in the copending application to which reference has already been made. The output of sine wave generator 13 is essentially a set of voltage steps, and in the actual apparatus we have constructed each step corresponds to one electrical degree, or one 1/360 of the sine wave period. If the voltage steps were of ideal form, consisting of perfect, flat plateaus connected by perfect vertical rises, all that would be necessary to make an ideal smooth sine wave cut of the stepped approximations would be a low-pass filtering operation performed by conventional low-pass filter 17. However, the imperfections of the waveform out of sine wave generator 13 consist of overshoots and other distortions as the voltage changes, distortions which either individually or collectively turn out to have troublesome high frequency components not completely removable by a conventional low-pass filter. The deglitcher is essentially a switch whose small open time intervals span the still smaller time intervals in which the troublesome transient distortions occur. It removes only those distortions, leaving the major parts of the voltage steps, which can then be satisfactorily handled by filter 17.

While specific embodiments of the invention have been described in detail, it should be understood that the invention is not limited thereto, as many variations will be readily apparent to those skiled in the art and, thus, the invention is to be given the broadest possible interpretation within the terms of the following claims.

What is claimed is:

1. Circuit means for automatically determining the resonance frequency of a seismic detector element of a geophysical data acquisition system, comprising:

a. a sine wave voltage synthesizer generating a series of discrete voltages changing from one discrete voltage value to the next discrete value in response to activation pulses of a relatively high repetition rate, the entire series of discrete voltages collectively approximating an ideal smooth first sinusoidal voltage, said relatively high repetition rate being at least a hundred times the frequency of said approximated first sinusoidal voltage;

means responsive to said first sinusoidal voltage for imposing across said seismic detector element a second sinusoidal voltage identical in frequency therewith for driving through said element a current exactly inverse to a reference current driven through a pure resistance by said first sinusoidal voltage;

c. automatic means responsive to said first and second sinusoidal voltages for (i) first sensing a phase difference between said first voltage driving said reference current through said pure resistance and said second voltage driving the inverse of said reference current through said seismic detector element, and (ii) then automatically adjusting said repetition rate associated with the generation of said series of discrete voltages, to change said sensed phase difference until a final phase difference of substantially 180° exists between said first and second sinusoidal voltages, the frequency finally occurring being the resonance frequency of said seismic detector element; and d. means for continuously indicating and displaying the frequency of said sinusoidal voltages, including said finally occurring resonance frequency, with relatively high precision, by counting the activation pulses of said synthesizer generating said approximated first sinusoidal voltage in a time period $\Delta t$ given by the relationship:

$$\Delta t = \frac{10^D}{C} \text{ seconds}$$

where D = the number of decimal places desired in the frequency to be represented and C = the number of activation pulses associated with said synthesizer per cycle of said generated voltages.

2. The circuit means of claim 1 in which (b) includes an operational amplifier having an input connected through said pure resistance, to (a), and at least two parallel outputs, one said output being connected to said element under test in a feedback loop, and another of said outputs being connected to (c).

3. The circuit means of claim 1 in which (c) includes:
   i. first and second parallel square wave generators, said first generator connected in parallel with said pure resistance for developing a first square wave associated with said first sinusoidal voltages, and said second generator connected in parallel with said element under test for generating a second square wave associated with said second sinusoidal voltage, said association between said generated square waves and said sinusoidal voltages being such that positive and negative portions and zero crossing points of the former coincide with corresponding positive and negative portions and zero crossing points of said first and second sinusoidal voltages;
   ii. a digital phase detector connected to said first and second square wave generators for indicating phase difference between said square wave outputs thereof;
   iii. a lead/lag detector having a plurality of inputs, one being connected to (a), another to said first square wave generator, and yet another to said phase detector, and an output connected through a control switch and capacitor to (a), for indicating a lead/lag relationship of said generated square waves, and then automatically adjusting (a) in a correct direction to change said sensed phase difference of said phase detector to said final difference of substantially 180°.

4. The circuit means of claim 1 in which (a) is a VCO pulse train generator having first and second parallel outputs connected to a sine wave generator and (d), respectively.

5. Method for automatically determining the resonance frequency of a seismic detector element of a geophysical data acquisition system, comprising:
   i. generating from a series of discrete voltage samples changing at a relatively high repetition rate, an approximation of a first ideal smooth sinusoidal voltage;
   ii. applying said first sinusoidal voltage across a substantially pure resistance to the input of an operational amplifier in whose feedback loop is connected said seismic detector element, so that the current caused to flow through said seismic detector element is the exact inverse of the current caused to flow through said pure resistance by said first sinusoidal voltage;
   iii. sensing the phase difference between the second sinusoidal voltage across said detector element caused by the flow of said current through said seismic detector element and said first voltage across said pure resistance;
   iv. automatically adjusting the common frequency of said first and second voltages until a frequency is reached at which said phase difference is substantially 180°, that frequency being the resonance frequency of said seismic detector element;
   v. indicating and displaying said frequency during the automatic adjustment process, and after said frequency has reached its resonance frequency value, by counting the number of changes of said discrete voltage samples in a time period $\Delta t$ given by the relationship:

$$\Delta t = \frac{10^D}{C} \text{ seconds}$$

where D = the number of decimal places desired in the frequency representation, and C = the number of said changes of said discrete voltage samples per cycle of said first sinusoidal voltage.

6. The method of claim 5 in which step (iii) of sensing of said phase difference includes the substeps of:
   1. generating square waves corresponding to said first and second sinusoidal voltages such that positive and negative portions and zero crossings of the former coincide with positive and negative portions and zero crossings of said first and second sinusoidal voltages; and
   2. determining the degree of coincidence between portions of said generated square waves so as to indicate phase difference between said first and second sinusoidal voltages.

7. The method of claim 5 in which steps (iii) and (iv) include the substeps of:
   1. generating square waves corresponding to said first and second sinusoidal voltages such that positive and negative portions and zero crossings of the former coincide with positive and negative portions and zero crossings of first and second sinusoidal voltages;
   2. determining the degree of coincidence between portions of said generated square waves so as to indicate phase difference between said first and second sinusoidal voltages;

3. determining a lead/lag relationship between said generated square waves; and
4. automatically adjusting the frequency of said generated first and second sinusoidal voltages in a correct direction based on substep (3) and in a correct amount using substep (2) until said generated phase difference between sinusoidal voltages of substantially 180° is reached, that final frequency being the resonance frequency of said seismic detector element.

* * * * *